(No Model.)
C. B. JONES, J. M. EDGAR & L. LE P. McCARTY.
SADDLE SUPPORT FOR CYCLES.
No. 585,213. Patented June 29, 1897.
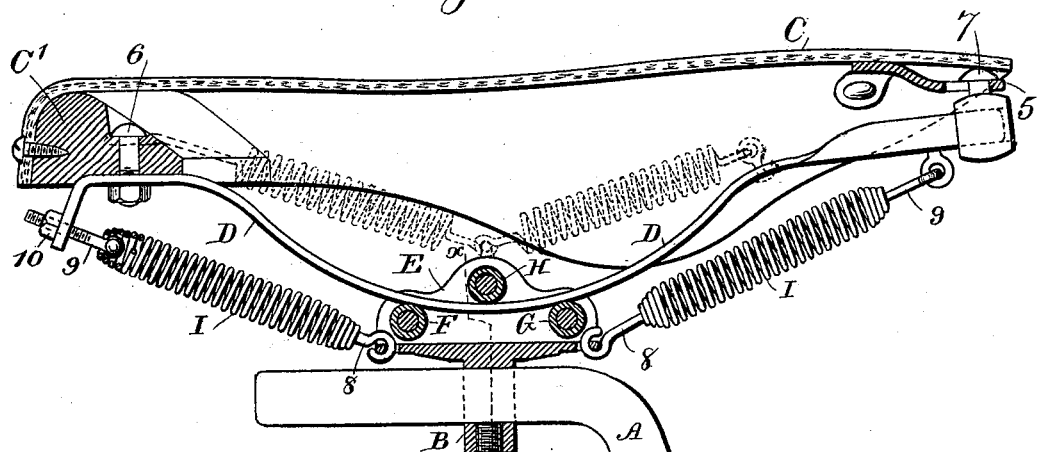
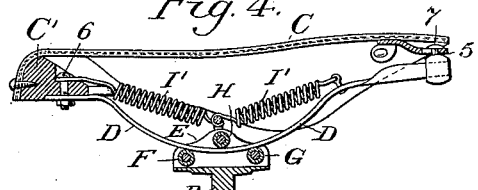
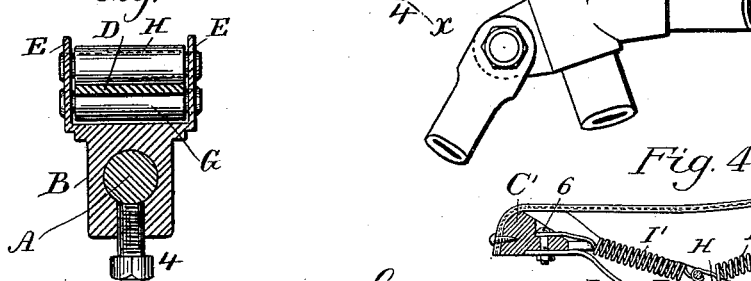
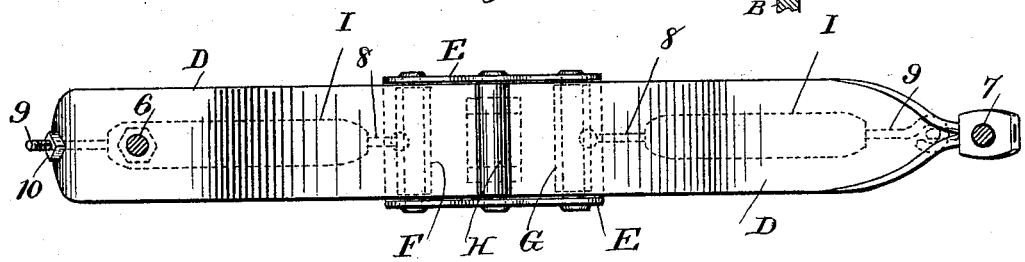
Witnesses
Chas. H. Smith
J. Staib
Inventors
Charles B. Jones
Joseph M. Edgar
Lyman Le P. McCarty
per L. W. Serrell & Son
Attys

UNITED STATES PATENT OFFICE.

CHARLES B. JONES, JOSEPH M. EDGAR, AND LYMAN LE P. McCARTY, OF NEW YORK, N. Y.

SADDLE-SUPPORT FOR CYCLES.

SPECIFICATION forming part of Letters Patent No. 585,213, dated June 29, 1897.

Application filed June 2, 1896. Serial No. 594,017. (No model.)

*To all whom it may concern:*

Be it known that we, CHARLES B. JONES, JOSEPH M. EDGAR, and LYMAN LE P. MC-CARTY, citizens of the United States, residing at the city of New York, in the county and State of New York, have invented an Improvement in Saddle-Supports for Cycles, of which the following is a specification.

The object of the present invention is to maintain the saddle in a substantially horizontal position when the cycle is either ascending a hill or descending an incline, so that the same will be more convenient and comfortable for the rider.

The devices that have heretofore been proposed for accomplishing this object have been heavy or cumbersome and liable to become wedged or obstructed in the movement. We place upon the saddle-bar a truck with three rollers, and we connect with the saddle an elliptical bar resting upon the two lower rolls and passing beneath the upper roll in the truck, so that the elliptical bar is free to slide endwise through the truck under the action of the weight of the rider, and contractile springs are used between the truck and the ends of the elliptical bar, tending to draw the saddle back to a normal position.

In the drawings, Figure 1 is a side view with the saddle in section and with one side of the truck removed. Fig. 2 is a plan view below the saddle, and Fig. 3 is a section at the line x x of Fig. 1. Fig. 4 is a diagram showing the springs above the bar.

The saddle-bar A is of ordinary character, and the clip B is received onto the horizontal member of the saddle-bar, and the screw 4 confines the clip to the saddle-bar.

The saddle C is of any desired character, and usually there is a saddletree C' at the back end and a connection 5 at the front end, and the elliptical bar D is approximately similar to the lower member of an ordinary elliptical spring, and there is a bolt 6 that connects the back end of the bar D to the saddletree C'; and at the front end of the bar D a stud 7 receives the connection 5.

Upon the clip B is the truck E, preferably formed of sheet metal and permanently connected to such clip B, and the sides are turned up at right angles to the bottom, so as to receive the shafts or arbors of the rolls F G H, and the bar D rests upon the rolls F and G and is beneath the roll H, and the width of the truck E is sufficient for the bar D to slide freely endwise between the sides of the truck.

It will now be apparent that the bar D and saddle will be firmly supported by the truck, but such bar D can move freely and endwise upon the truck, so that the rider can easily cause the saddle to assume or maintain a substantially horizontal position regardless of the inclination of the cycle in going up or down a grade, and when coming down a grade the rider will usually bear most heavily at the back part of the saddle, and in so doing the bar D will slip forward and the front end rise as the back end descends, and, on the contrary, when going up an incline the rider will sit farther toward the front of the saddle, and that end being slightly depressed will cause the elliptical bar to slide in the truck and the rear end of the saddle to be raised.

In order to prevent a sudden or extended endwise movement of the elliptical bar in the truck, springs are made use of between the front and back portions of such truck and the end portions of the elliptical bar. These springs are advantageously helical, as shown at I, and the end portions of these springs should be reduced to spiral forms, so as to surround the heads of the rods or wires 8 9, the rods 8 hooking into holes in the bottom of the truck E and the rods 9 passing through eyes or holes at the ends of the elliptical bar D, as it is advantageous to provide nuts 10 upon the rods 9, so as to adjust the tension of the springs, and it will be observed that when one spring is put under tension the rods 8 and 9 of the other spring can run into the spring more or less without subjecting such spring to compression. Hence these springs will readily restore the saddle to a normal position when the cycle is substantially level.

If desired, the contractile springs can be placed above the curved bar and connected at their outer ends with the saddle and at their inner ends with a cross-bar above the top roller, as shown in the small diagram, Fig. 4.

We claim as our invention—

1. The combination with the saddle and saddle-bar, of a truck connected with the saddle-bar and having three triangularly-arranged rolls, a downward-curved bar connected at its ends to the saddle and resting upon the two lower rolls and passing beneath the upper roll in the truck, such downward-curved bar sliding between the sides of the truck and being guided by them, substantially as set forth.

2. The combination with the saddle and saddle-bar, of a truck connected with the saddle-bar and having three triangularly-arranged rolls, a downward-curved bar connected at its ends to the saddle and resting upon the two lower rolls and passing beneath the upper roll in the truck, such downward-curved bar sliding between the sides of the truck and being guided by them, and contractile springs connected at their ends with the truck and with the end portion of the bar below the saddle, substantially as set forth.

3. The saddle-bar and a clip thereon, in combination with a truck connected to and supported by the clip, three triangularly-arranged rollers in the truck, a saddle and a downward-curved bar connected at its ends with the saddle and resting upon two of the rollers in the truck and passing beneath the intermediate roll, contractile springs having spiral ends and rods having heads within the springs and connected respectively to the truck and to the ends of the downward-curved bar adjacent to the saddle, substantially as set forth.

4. The combination with the saddle and saddle-bar, of a truck having sides and connected to the saddle-bar, a downward-curved bar below the saddle and connected at its ends with such saddle, and rollers across between the sides of the truck, and between which rollers the curved bar slides, and contractile springs acting between the truck and saddle to return the latter to a normal position, substantially as set forth.

Signed by us this 29th day of May, 1896.

CHAS. B. JONES.
JOSEPH M. EDGAR.
LYMAN LE P. McCARTY.

Witnesses:
GEO. T. PINCKNEY,
S. T. HAVILAND.